(12) United States Patent
Sakai (10) Patent No.: US 11,375,126 B2
(45) Date of Patent: Jun. 28, 2022

(54) IMAGING APPARATUS, INFORMATION PROCESSING APPARATUS, OPERATION METHOD, INFORMATION PROCESSING METHOD, AND STORAGE MEDIUM

(71) Applicant: CANON KABUSHIKI KAISHA, Tokyo (JP)

(72) Inventor: Shiori Sakai, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/095,895

(22) Filed: Nov. 12, 2020

(65) Prior Publication Data
US 2021/0168294 A1 Jun. 3, 2021

(30) Foreign Application Priority Data

Nov. 29, 2019 (JP) .............................. JP2019-217504
Jul. 31, 2020 (JP) .............................. JP2020-130776

(51) Int. Cl.
*H04N 5/232* (2006.01)
*G06V 20/52* (2022.01)

(52) U.S. Cl.
CPC ..... *H04N 5/23299* (2018.08); *H04N 5/23218* (2018.08); *H04N 5/23229* (2013.01); *G06V 20/52* (2022.01)

(58) Field of Classification Search
CPC ........... H04N 5/23299; H04N 5/23218; H04N 5/23229; H04N 5/2258; H04N 7/18; H04N 7/181; H04N 5/232; G06K 9/00771
See application file for complete search history.

(56) References Cited

U.S. PATENT DOCUMENTS

2006/0115124 A1* 6/2006 Nobori ..................... B60R 1/00
 382/104
2007/0206945 A1* 9/2007 DeLorme ............... G03B 41/00
 396/332
(Continued)

FOREIGN PATENT DOCUMENTS

JP 2001-320616 * 11/2001 ............. H04N 5/225
JP 2001320616 A 11/2001
(Continued)

OTHER PUBLICATIONS

Extended European Search Report issued by the European Patent Office dated Feb. 4, 2021 in corresponding EP Patent Application No. 20207383.9.
(Continued)

*Primary Examiner* — Hung H Lam
(74) *Attorney, Agent, or Firm* — Carter, DeLuca & Farrell LLP (57) ABSTRACT

There is provided with an imaging apparatus that contains a plurality of imaging sections. An obtaining unit obtains, from an information processing apparatus, identification information designating two or more imaging sections among the plurality of imaging sections. A determination unit determines, based on pieces of profile information each containing setting information regarding a captured image from each of the imaging sections corresponding to the two or more imaging sections, setting information regarding the captured images upon collectively distributing the captured images from the two or more imaging sections. A generation unit generates a virtual profile containing the setting information determined. A sending unit sends information regarding the virtual profile to the information processing apparatus.

21 Claims, 7 Drawing Sheets

(56) References Cited

U.S. PATENT DOCUMENTS

| | | | |
|---|---|---|---|
| 2008/0122949 A1 | 5/2008 | Kindborg et al. | |
| 2014/0118545 A1 | 5/2014 | Iwasaki | |
| 2014/0146132 A1* | 5/2014 | Bagnato | G03B 37/04 348/36 |
| 2018/0343431 A1* | 11/2018 | Veldandi | H04N 13/207 |
| 2019/0392567 A1* | 12/2019 | Friebe | B60R 1/00 |

FOREIGN PATENT DOCUMENTS

| | | |
|---|---|---|
| WO | 2019008019 A1 | 1/2019 |
| WO | 2019182101 A1 | 9/2019 |

OTHER PUBLICATIONS

"ONVIF Specification Map" ONVIF Doc Map.html, https://www.onvif.org/specs/DocMap.html, accessed on Sep. 23, 2020, pp. 1-2.

\* cited by examiner

IMAGING APPARATUS, INFORMATION PROCESSING APPARATUS, OPERATION METHOD, INFORMATION PROCESSING METHOD, AND STORAGE MEDIUM

BACKGROUND OF THE INVENTION

Field of the Invention

The present invention relates to an imaging apparatus, an information processing apparatus, an operation method, an information processing method, and a storage medium.

Description of the Related Art

In recent years, a multi-eye camera has become popular as a surveillance camera for the purpose of capturing images in all directions. In the multi-eye camera, videos from a plurality of imaging sections are synthesized and distributed. For example, Open Network Video Interface Forum (to be referred to as ONVIF hereinafter), which is a common standard regarding a connection between a network camera and a client, has been used. In ONVIF, video source settings including the view mode and the resolution that can be output by the sensor, video encoder settings including the encode mode and resolution of image encoding, and the like are defined as the settings (configuration) of the surveillance camera. The configuration is mapped on a profile (profile) designated when controlling the surveillance camera, and the surveillance camera performs distribution, control, and the like of a video in accordance with the contents of the configuration mapped on the profile.

As "ONVIF Specification Map". ONVIF Doc Map.html, a command called CreateMultitrackConfiguration, which is a command for synthesizing profile information, is standardized in ONVIF. The CreateMultitrackConfiguration command is a command for creating virtual profile information (virtual profile) by a user selecting a plurality of profiles.

Japanese Patent Laid-Open No. 2001-320616 discloses a technique in which when videos are captured at the same time and a plurality of the videos thus obtained are synthesized and displayed, the settings are changed so that a synthesis video with uniform image quality can be displayed.

SUMMARY OF THE INVENTION

According to one embodiment of the present disclosure, an imaging apparatus that contains a plurality of imaging sections comprises: an obtaining unit configured to obtain, from an information processing apparatus, identification information designating two or more imaging sections among the plurality of imaging sections; a determination unit configured to determine, based on pieces of profile information each containing setting information regarding a captured image from each of the imaging sections corresponding to the two or more imaging sections, setting information regarding the captured images upon collectively distributing the captured images from the two or more imaging sections; a generation unit configured to generate a virtual profile containing the setting information determined by the determination unit; and a sending unit configured to send information regarding the virtual profile to the information processing apparatus.

According to another embodiment of the present disclosure, an information processing apparatus comprises: a sending unit configured to send identification information designating two or more imaging sections among a plurality of imaging sections contained in an imaging apparatus: and a receiving unit configured to receive information regarding a virtual profile containing setting information regarding captured images upon collectively distributing the captured images from the two or more imaging sections, the setting information being determined based on pieces of profile information each containing setting information regarding the captured image from each of the imaging sections corresponding to the two or more imaging sections.

According to still another embodiment of the present disclosure, an operation method of an imaging apparatus that contains a plurality of imaging sections comprises: obtaining, from an information processing apparatus, identification information designating two or more imaging sections among the plurality of imaging sections; determining, based on pieces of profile information each containing setting information regarding a captured image from each of the imaging sections corresponding to the two or more imaging sections, setting information regarding the captured images upon collectively distributing the captured images from the two or more imaging sections; generating a virtual profile containing the setting information determined: and sending information regarding the virtual profile to the information processing apparatus.

According to yet another embodiment of the present disclosure, an information processing method comprises: sending identification information designating two or more imaging sections among a plurality of imaging sections contained in an imaging apparatus; and receiving information regarding a virtual profile containing setting information regarding captured images upon collectively distributing the captured images from the two or more imaging sections, the setting information being determined based on pieces of profile information each containing setting information regarding the captured image from each of the imaging sections corresponding to the two or more imaging sections.

According to still yet another embodiment of the present disclosure, an imaging apparatus that contains a plurality of imaging sections comprises: a determination unit configured to determine, based on a designation of two or more imaging sections among the plurality of imaging sections, a synthesis method of images upon collectively distributing the images from the two or more imaging sections, wherein a synthesis method is determined in accordance with an arrangement of the two or more imaging sections.

According to yet still another embodiment of the present disclosure, an imaging apparatus that contains a plurality of imaging sections comprises: a first determination unit configured to determine, based on a designation of two or more imaging sections among the plurality of imaging sections, a synthesis method of images upon collectively distributing the images from the two or more imaging sections; and a second determination unit configured to determine an operation method of the imaging apparatus when the designated imaging section has been moved after the collective distribution of the images from the two or more imaging sections.

According to still yet another embodiment of the present disclosure, a non-transitory computer-readable storage medium storing a program that, when executed by a computer, causes the computer to perform a method, the method comprises: obtaining, from an information processing apparatus, identification information designating two or more imaging sections among the plurality of imaging sections; determining, based on pieces of profile information each containing setting information regarding a captured image from each of the imaging sections corresponding to the two or more imaging sections, setting information regarding the captured images upon collectively distributing the captured images from the two or more imaging sections: generating a virtual profile containing the determined setting information; and sending information regarding the virtual profile to the information processing apparatus.

Further features of the present invention will become apparent from the following description of exemplary embodiments (with reference to the attached drawings).

DESCRIPTION OF THE EMBODIMENTS

In "ONVIF Specification Map". ONVIF Doc Map.html, it is determined only that a virtual profile is returned when a CreateMultitrackConfiguration command is received in the ONVIF standard. That is, the contents of the virtual profile are not clearly defined. Further, since there is no unit configured to obtain the information of the virtual profile, there is a problem that the user cannot check the contents until the synthesis video is distributed.

Furthermore, in Japanese Patent Laid-Open No. 2001-320616, setting values are changed to display a uniform synthesis video, but the parameters of videos to be synthesized are not combined together.

An embodiment of the present invention can obtain the information of a synthesis image in which images from a plurality of imaging sections are collectively distributed.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

An imaging apparatus according to this embodiment obtains, from an information processing apparatus, identification information specifying two or more imaging sections among a plurality of imaging sections contained in the imaging apparatus. Then, based on profile information indicating the configuration of the two or more imaging sections, virtual profile information indicating the setting information upon collectively distributing captured images is created. Further, identification information specifying the created virtual profile information is sent to the information processing apparatus. For the processing as described above, the imaging apparatus and the information processing apparatus according to this embodiment have, for example, the functional arrangements shown in FIGS. 1 and 2 to be described later, respectively. The imaging apparatus according to this embodiment performs the following operation using commands standardized in ONVIF.

In this example, the configuration (Configuration) refers to the settings of the surveillance camera as described above. The configuration includes setting information regarding an image captured by the imaging section. The configuration may include information indicating the quality of the image captured by the surveillance camera. In ONVIF, video source settings including the view mode and the resolution that can be output by the sensor, video encoder settings including the encode mode and resolution of image encoding, and the like are defined as the configuration. Here, the view mode indicates a method of displaying an image (for example, regarding a synthesis image constituted by a plurality of captured images, whether the constituent images are individually arranged or synthesized). The imaging apparatus according to this embodiment obtains the configuration of the imaging section contained in the surveillance camera in accordance with an instruction from the information processing apparatus. The surveillance camera can perform distribution, control, and the like of a video in accordance with the contents of the configuration mapped on a profile designated by the information processing apparatus.

As has been described above, the CreateMultitrackConfiguration command is a command for creating virtual profile information (virtual profile) by synthesizing a plurality of pieces of profile information selected by the information processing apparatus. The virtual profile information indicates the selected pieces of profile information and a display method upon collectively distributing captured images from the imaging sections corresponding to the pieces of profile information, or setting information including pieces of quality information of images to be collectively distributed, and the detailed description thereof will be described later. As the display method for collectively distributing the images, for example, a method of arranging the captured images or synthesizing them may be indicated. According to such a command, it becomes possible to collectively distribute sessions for distributing a plurality of captured images. Hereinafter, for simplicity, an image in which a plurality of captured images are arranged or synthesized to be collectively distributed as described above is referred to as a synthesis image.

Figure 1:
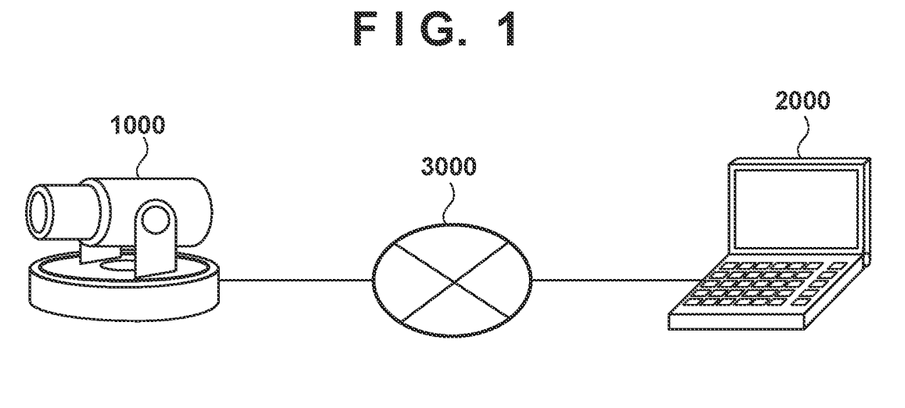
FIG. 1 is a view showing an example of a network configuration including an imaging apparatus according to the first embodiment.

FIG. 1 shows an example of the network configuration diagram including a camera 1000 as an imaging apparatus according to this embodiment. The camera 1000 and an information processing apparatus 2000 as a client apparatus are connected to each other via a network 3000 such that they can communicate with each other. The information processing apparatus 2000 sends respective control commands such as a command for requesting the camera 1000 for profile synthesis. The camera 1000 sends a response to the command to the information processing apparatus 2000.

Figure 2:
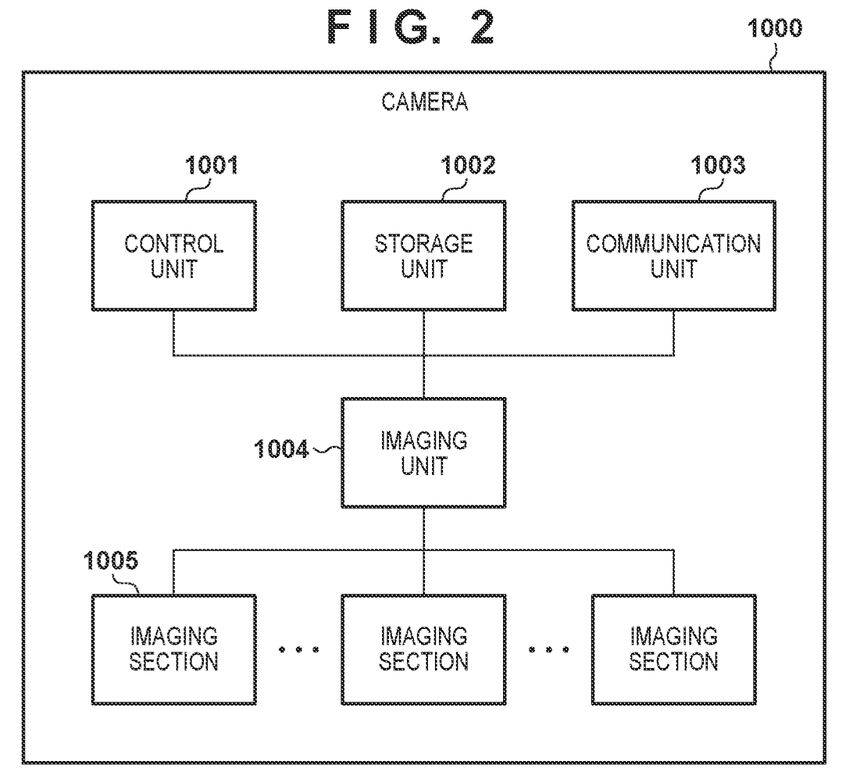
FIG. 2 is a block diagram showing an example of the functional arrangement of the imaging apparatus according to the first embodiment.

FIG. 2 is a block diagram showing an example of the functional arrangement of the imaging apparatus according to this embodiment. A control unit 1001 controls the overall imaging apparatus. The control unit 1001 is formed by, for example, a CPU. A storage unit 1002 is used as a storage area for various data. The storage unit 1002 can store, for example, programs to be executed mainly by the control unit 1001, setting values such as the view mode (ViewMode) and encoder (Encoding) of a captured image to be described later, and data such as image data generated by an imaging unit 1004 to be described later. The storage unit 1002 may also function as a work area during executing the program. A communication unit 1003 is used when connecting the camera 1000 and the information processing apparatus 2000. The communication unit 1003 may be used to receive a command for requesting a change or control of each setting value from the information processing apparatus 2000 via the network 3000. The communication unit 1003 may also be used to send, to the information processing apparatus 2000, a response from the camera 1000 to each command and various data such as image data stored in the storage unit 1002. The imaging unit 1004 obtains an analog signal obtained by capturing an image of an object by an imaging section 1005 to be described later. The imaging unit 1004 converts the obtained analog signal to digital data and outputs it to the storage unit 1002 as a captured image. Two or more imaging sections 1005 are provided in one camera 1000. The imaging section 1005 is formed by an imaging optical system including a lens and an image sensor, and a pan, tilt, or zoom section that controls the imaging direction or angle of view. The imaging section 1005 can also obtain a video constituted by sequentially captured images.

The internal arrangement of the camera 1000 has been described above using FIG. 2, but the arrangement describe above describes an example of the arrangement of the imaging apparatus according to this embodiment, and the present invention is not limited thereto. Various changes and modifications can be made to the imaging apparatus according to this embodiment within the spirit and scope of the present invention, such as providing an image analysis unit, a voice input unit, or a voice output unit, for example.

Figure 3:
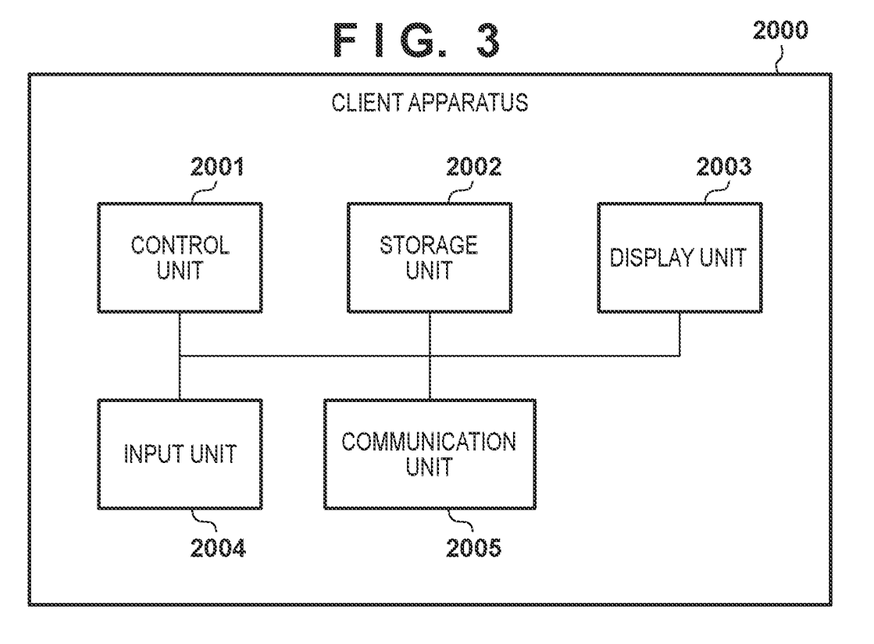
FIG. 3 is a block diagram showing an example of the functional arrangement of an information processing apparatus according to the first embodiment.

FIG. 3 is a block diagram showing an example of the internal arrangement of the information processing apparatus 2000. A control unit 2001 is formed by, for example, a CPU, and controls the overall information processing apparatus 2000. A storage unit 2002 is used as a storage area for, for example, programs to be executed mainly by the control unit 2001 and various data such as information of a connectable camera which is currently on the network 3000. The storage unit 2002 may also function as a work area during executing the program. A display unit 2003 is formed by, for example, an LCD or the like, and displays, to a user of the information processing apparatus 2000, various setting screens, a data obtainment/display screen, various types of messages, or the like. An input unit 2004 is formed by, for example, a button, a touch panel, a mouse, or the like, and transfers the contents of an operation by the user to the control unit 2001. A communication unit 2005 is used, for example, when a command such as a profile synthesis request is sent to the camera 1000 via the network 3000 or when a response to each change command is received from the camera 1000.

The internal arrangement of the information processing apparatus 2000 has been described above using FIG. 3, but the arrangement described above describes an example of the arrangement of the information processing apparatus according to this embodiment, and the present invention is not limited thereto. The information processing apparatus according to this embodiment may have an arrangement including, for example, a received image display unit, an image analysis processing unit, or an image storage unit, and various changes and modifications can be made within the sprit and scope of the present invention.

Figure 4:
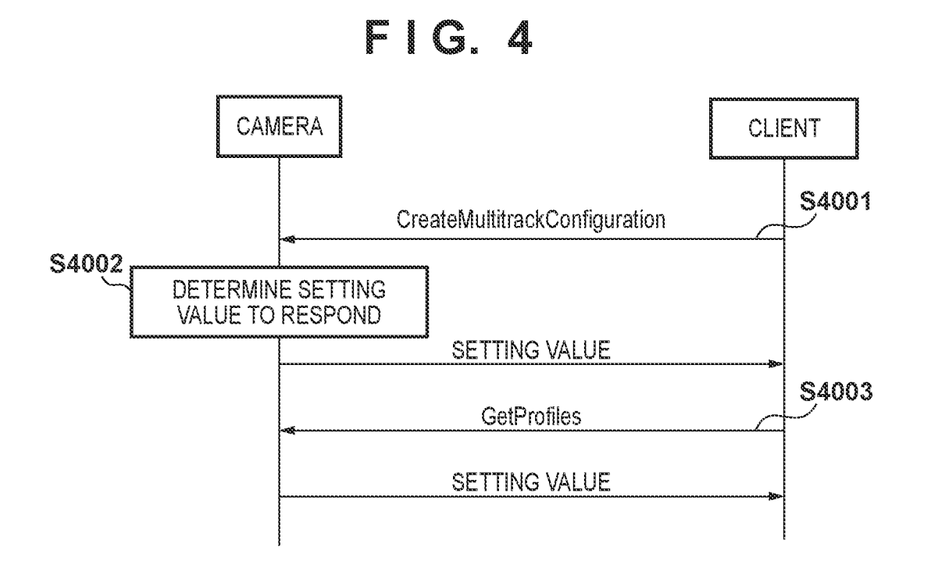
FIG. 4 is a sequence chart showing an example of a sequence of an ONVIF command operation according to the first embodiment.

Next, with reference to a sequence chart of FIG. 4, an example of profile synthesis (steps S4001 and S4002) and profile information obtaining processing (step S4003) using ONVIF commands will be described.

In step S4001, the information processing apparatus 2000 sends a CreateMultitrackConfiguration command (synthesis request command) to the camera. In step S4002, the camera 1000 creates a virtual profile as described above in accordance with the CreateMultitrackConfiguration command. When receiving the CreateMultitrackConfiguration command, the camera 1000 simultaneously obtains, from the information processing apparatus 2000, identification information specifying two or more imaging sections among the imaging sections 1005. In the following description, the information processing apparatus 2000 adds, to the CreateMultitrackConfiguration command, an identifier called profileToken which designates the profile of the imaging section 1005. Although the details will be described later with reference to FIG. 5, the camera 1000 can create the virtual profile indicating the above-described setting information by synthesizing, based on pieces of profile information of the imaging sections 1005 corresponding to the obtained identifiers, the selected pieces of profile information. Further in step S4002, the camera 1000 determines a setting value to respond to the information processing apparatus 2000 when the CreateMultitrackConfiguration command is received. The camera 1000 according to this embodiment can return the information regarding the virtual profile to the information processing apparatus 2000 in response to the CreateMultitrackConfiguration command. More specifically, the camera 1000 can return an identifier specifying the virtual profile created as described above to the information processing apparatus 2000 in response to the CreateMultitrackConfiguration command.

In step S4003, the information processing apparatus 2000 sends a GetProfiles command to the camera. The GetProfiles command is a command standardized in ONVIF and designating an identifier to obtain the configuration included in the profile corresponding to the identifier from the camera 1000. The information processing apparatus 2000 can send the GetProfiles command which designates the identifier specifying the virtual profile created in step S4002 to the camera 1000 via the communication unit 1003. When the GetProfiles command which designates the identifier specifying the virtual profile is received, the camera 1000 sends the setting information included in the virtual profile to the information processing apparatus 2000.

An example of profile synthesis and profile information obtaining processing based on ONVIF commands has been described above using FIG. 4, but the processing described above describes an example of processing according to this embodiment, and the present invention is not particularly limited thereto.

Next, with reference to the flowchart of FIG. 5 and the profile selection image diagrams of FIGS. 6A to 6C, the internal processing of determining the setting information of the virtual profile using the ONVIF command according to this embodiment will be described in detail. In step S5001, the camera 1000 receives the CreateMultitrackConfiguration command from the information processing apparatus 2000. As has been described above, the CreateMultitrackConfiguration command is a command for creating the above-described virtual profile information by the user selecting a plurality of profiles.

In step S5002, the camera 1000 reads out the VideoSource and the VideoEncoder included in the profile corresponding to the identifier added to the command received in step S5001. The VideoSource includes a SourceToken parameter indicating camera information, and the VideoEncoder includes an Encoding parameter indicating encoder information. The camera 1000 reads out the VideoSource and the VideoEncoder stored in the storage unit 1002 to use them in view mode setting of a synthesis image performed in steps S5003 and S5005 and encoder setting performed in step S5008, which will be described later. The camera information may be, for example, information indicating the arrangement (positional relationship) of the imaging unit. The encoder information may be the quality information of the captured image from the imaging unit, that is, the compression rate or the encoding method thereof.

In steps S5003 to S5007, the camera 1000 sets, as the setting information of the synthesis image, the method of collectively displaying the captured images upon distributing the synthesis image. In step S5003, the camera 1000 can determine the view mode of the synthesis image in accordance with a combination of the imaging sections (for example, in accordance with the arrangement of the imaging sections) corresponding to a plurality of the SourceToken parameters read out in step S5002. As has been described above, the view mode indicates the display method of the image. As the view mode of the synthesis image, it is possible to use a divided display in which a plurality of captured images are individually displayed, or a synthesis display in which a plurality of captured images are synthesized and displayed. In this embodiment, if the imaging sections corresponding to the selected SourceToken parameters are not adjacent to each other on the imaging apparatus, such as the imaging sections 1, 4, and 7 selected in FIG. 6A, the process advances to step S5004. That is, if there is the imaging section whose imaging range does not include an area that overlaps with the imaging range of any other imaging section, the process advances to step S5004. On the other hand, if all the imaging sections corresponding to the selected SourceToken parameters are adjacent to each other (that is, if at least a part of the imaging range of any imaging section overlaps with the imaging range of any other imaging section), the process advances to step S5005. In step S5004, the camera 1000 sets the ViewMode to quad, that is, selects the divided display as the view mode, and advances the process to step S5008.

If the synthesis display is selected as the view mode, the angle of view of the synthesis image is determined in steps S5005 to S5007. In step S5005, the camera 1000 determines the view mode of the synthesis image based on the combination of the imaging sections corresponding to the SourceToken parameters read out in step S5002 (for example, in accordance with the angle of view obtained by combining the angles of view of the imaging sections). In this embodiment, if the angle of view obtained by combining the angles of view of the imaging sections corresponding to the selected SourceToken parameters is equal to or smaller than 180°, as in a case in which the selected imaging sections are the imaging sections 1 to 3 selected in FIG. 6B, the process advances to step S5006. If the angle of view obtained by combining the angles of view of the imaging sections corresponding to the selected SourceToken parameters is larger than 180°, as in a case in which the selected imaging sections are the imaging sections 1 to 6 selected in FIG. 6C, the process advances to step S5007. The camera 1000 sets the ViewMode to 180° panorama and 360° panorama in steps S5006 and S5007, respectively, and advances the process to step S5008.

The synthesis image can be distributed to the display unit 2003 using the captured image display method according to the ViewMode set in steps S5003 to S5007. If the ViewMode is quad, the display unit 2003 may display the captured images from the selected imaging section while arranging them in individual frames (for example, on a screen divided into four). If the ViewMode is 180° panorama or 360° panorama, a panoramic image having an angle of view of 180° or 360° may be distributed by synthesizing the captured images from the selected imaging sections. Here, the panoramic image is an image obtained by synthesizing a plurality of images.

In step S5008, the camera 1000 uses the Encoding parameter readout in step S5002 to determine, as the setting information of the synthesis image, the quality information of the synthesis image upon distributing the synthesis image. In this example, the encoder information included in the virtual profile is determined. The storage unit 1002 in the camera 1000 stores a table indicating the encoder setting priority of the synthesis image. Based on the above-described table stored in the storage unit, the camera 1000 determines, among the pieces of encoder information indicated by the Encoding parameters included in the selected profiles, the encoder with a high setting priority as the encoder information of the virtual profile. In the table referred to here, the priority may be set to be high in the order of high image compression rate or in the order of low image compression rate. The priority may be set in the order not particularly limited thereto. Then, the process advances to step S5009, and the camera 1000 sends the identifier of the virtual profile including the set ViewMode and Encoding parameter to the information processing apparatus 2000.

The configuration determination method using the ONVIF command according to this embodiment has been described above with reference to FIG. 5, but the flowchart of FIG. 5 describes an example of the internal processing of the imaging apparatus according to this embodiment, and the present invention is not particularly limited thereto. For example, the camera 1000 may change the ViewMode in accordance with the number of selected profiles, or may determine the encoder information of the virtual profile in consideration of the control of the number of encoders. Various changes and modifications can be made to the configuration determination method in this embodiment within the scope of the present invention.

As has been described above, the imaging apparatus according to the first embodiment receives a CreateMultitrackConfiguration command from the information processing apparatus. Then, based on the pieces of camera information corresponding to the identifiers added to the received command, the display method of the captured images in the synthesis image is determined. Further, based on the pieces of encoder information corresponding to the identifiers added to the received command and the table indicating the encoder setting priority, the encoder of the synthesis image is determined.

According to such an arrangement, when synthesizing a plurality of profiles, it is possible to create a virtual profile that automatically has, as the setting information, the configuration similar to that of the existing profile. Therefore, it becomes possible to check the contents of the virtual profile using the existing profile information obtaining command (GetProfiles command).

Second Embodiment

With reference to FIGS. 1 to 3 and 7, an imaging apparatus according to the second embodiment of the present invention will be described below. Note that since the network configuration shown in FIG. 1, the internal arrangement of an imaging apparatus shown in FIG. 2, and the internal arrangement of an information processing apparatus shown in FIG. 3 are similar to those in the first embodiment, a repetitive description thereof will be omitted.

Figure 6A:
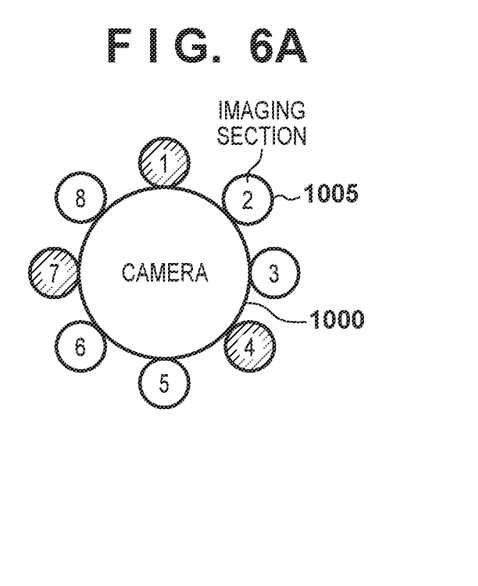
FIGS. 6A to 6C are views for explaining a ViewMode determination method according to the first embodiment.
Figure 6B:
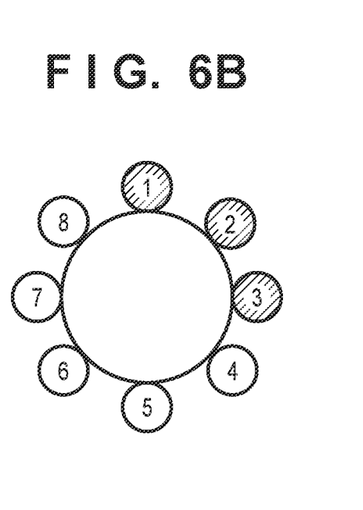
Figure 6C:
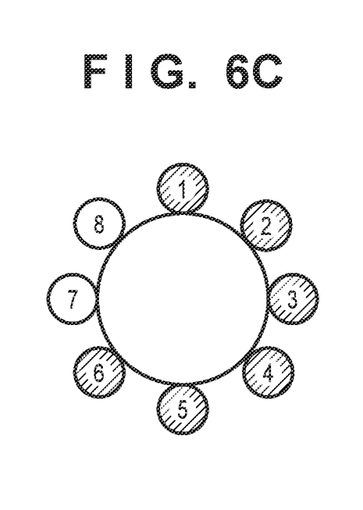
Figure 7:
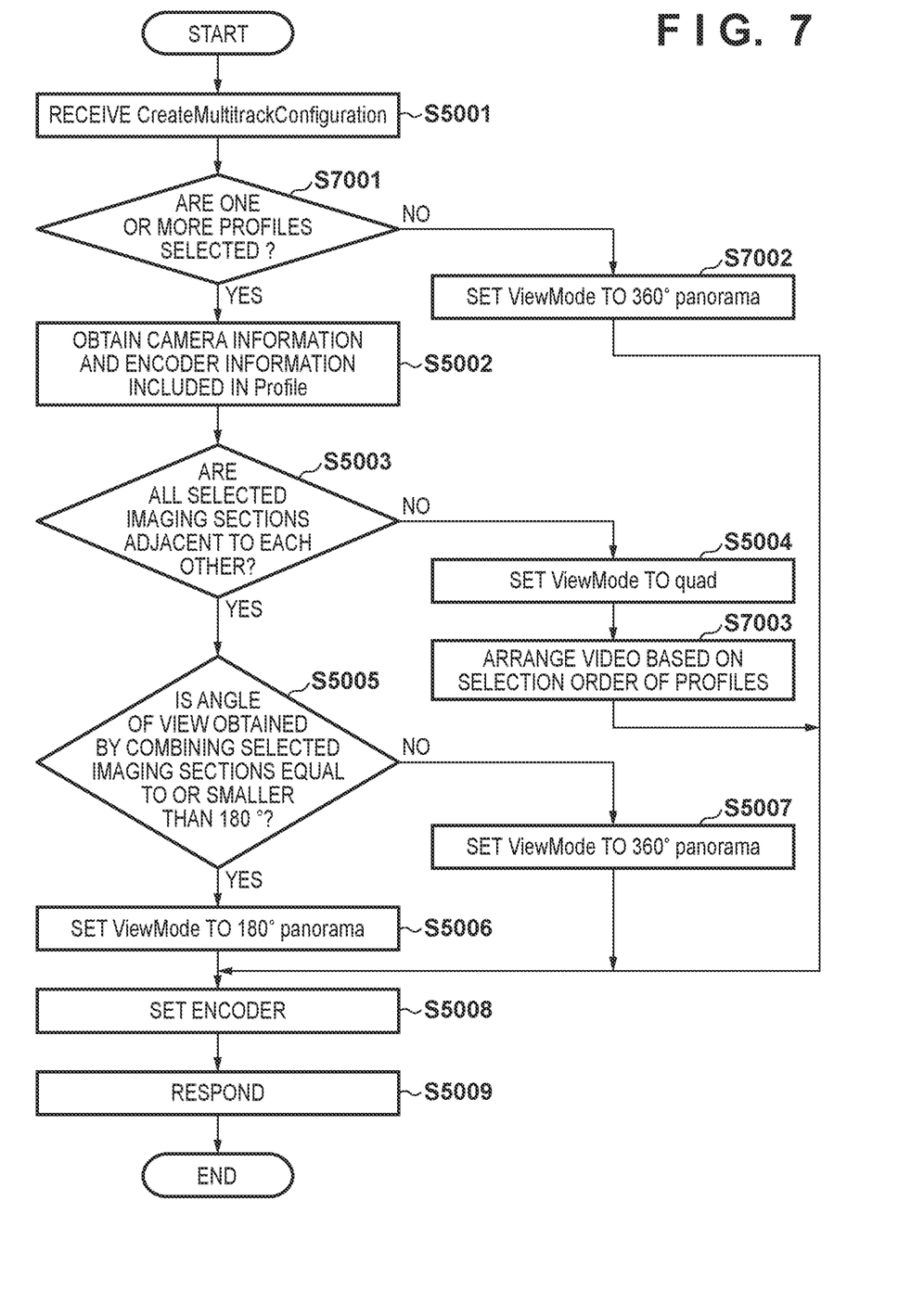
FIG. 7 is a flowchart illustrating a processing example in an operation method according to the second embodiment.

Details of a profile synthesis unit using ONVIF commands according to the second embodiment of the present invention will be described with reference to the flowchart of FIG. 7 and the image diagrams of FIGS. 6A to 6C, 8A, and 8B. The processing in FIG. 7 is similar to that in FIG. 5 except that steps S7001 to S7003 are added, and a repetitive description thereof will be omitted.

In step S7001 performed after step S5001, a camera 1000 checks whether a profile is selected in a CreateMultitrackConfiguration command. That is, it is checked whether an identifier designating the profile of an imaging section 1005 is added to the CreateMultitrackConfiguration command. If no profile is selected, the process advances to step S7002; otherwise, the process advances to step S5002.

In step S7002, the camera 1000 determines the ViewMode to a predetermined setting (for example, 360° panorama), and advances the process to step S5008. In addition, if it is confirmed in step S7001 that no profile is selected, the camera 1000 may use predetermined setting information as the encoder information of a virtual profile to be determined in step S5008.

Figure 8A:
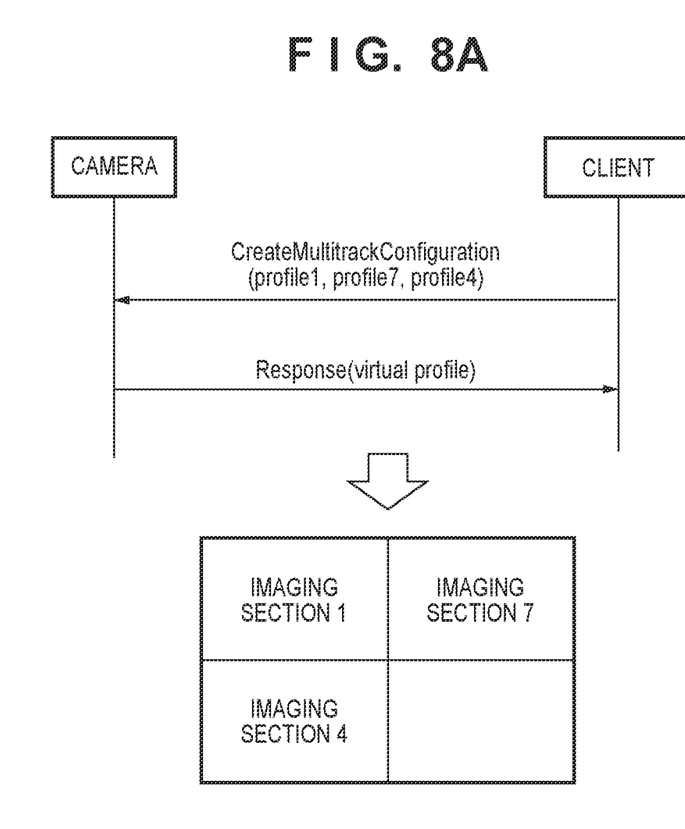
FIGS. 8A and 8B are views for explaining a ViewMode determination method according to the second embodiment.
Figure 8B:
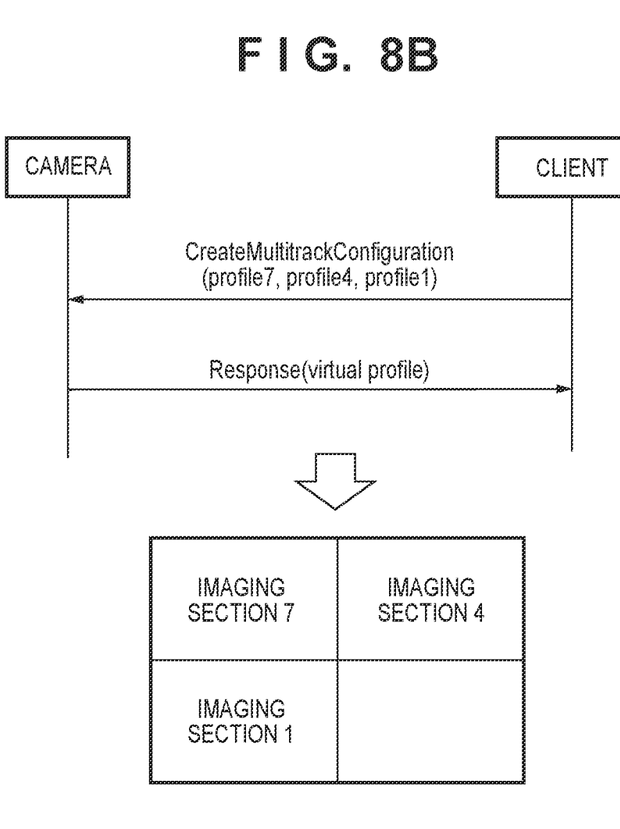

In step S7003 performed after step S5004, the camera determines the arrangement order of the captured images in the synthesis image based on the selection order of the profiles read out in step S5002. Here, the selection order of the profiles may be, for example, the order in which the identifiers are added to the CreateMultitrackConfiguration command. For example, if profiles 1, 4, and 7 are selected in the mentioned order as shown in FIG. 8A, the camera 1000 arranges the captured images from imaging sections 1, 4, and 7 corresponding to the respective profiles in the selection order. On the other hand, even when the same profiles are selected, if the profiles 7, 4, and 1 are selected in the mentioned order as shown in FIG. 8B, the camera 1000 arranges the captured images from the imaging sections 7, 4, and 1 corresponding to the respective profiles in the selection order.

The internal processing of the profile synthesis according to this embodiment has been described above with reference to FIG. 7, but the flowchart of FIG. 7 describes an example of the internal processing of the imaging apparatus according to this embodiment, and the present invention is not particularly limited thereto. Various changes and modifications can be made within the scope of the present invention, such as a case in which the camera 1000 changes the ViewMode in consideration of the selection order of the profiles, for example.

As has been described above, the imaging apparatus according to the second embodiment receives a CreateMultitrackConfiguration command (synthesis request command) from the information processing apparatus. Then, based on the pieces of camera information corresponding to the identifiers added to the received command, the display method of the captured images in the synthesis image is determined. Further, based on the pieces of encoder information corresponding to the identifiers added to the received command and the table indicating the encoder setting priority, the encoder of the synthesis image is determined. Differences from the first embodiment are that the presence/absence of profile selection is checked upon determining the ViewMode, and that the arrangement order of the captured images can be changed in accordance with the selection order of the profiles. Therefore, the ViewMode can be automatically set even if no profile is selected, or the video can be displayed in the order corresponding to the selection order of the profiles.

Third Embodiment

The imaging apparatus according to the first or second embodiment determines the ViewMode in accordance with the selected angle of view of the camera. However, if the imaging unit is moved after the configuration is determined, the image to be captured may change, and the imaging situation may become inappropriate for the created virtual profile. If an instruction of moving an imaging section 1005 is input after the virtual profile is created, an imaging apparatus according to this embodiment determines the processing performed by a camera 1000 in accordance with the operation priority to be described later.

With reference to FIGS. 1 to 3, 5, and 9, an imaging apparatus according to the third embodiment of the present invention will be described below. Note that since the network configuration shown in FIG. 1, the internal arrangement of an imaging apparatus shown in FIG. 2, and the internal arrangement of an information processing apparatus shown in FIG. 3 are basically similar to those in the first embodiment, a repetitive description thereof will be omitted. In the camera 1000 according to this embodiment, each imaging section 1005 can be moved. The imaging section 1005 may be moved electrically or manually. In the following description, the camera 1000 is an electric multi-eye camera, and each imaging section 1005 can be electrically moved.

Figure 5:
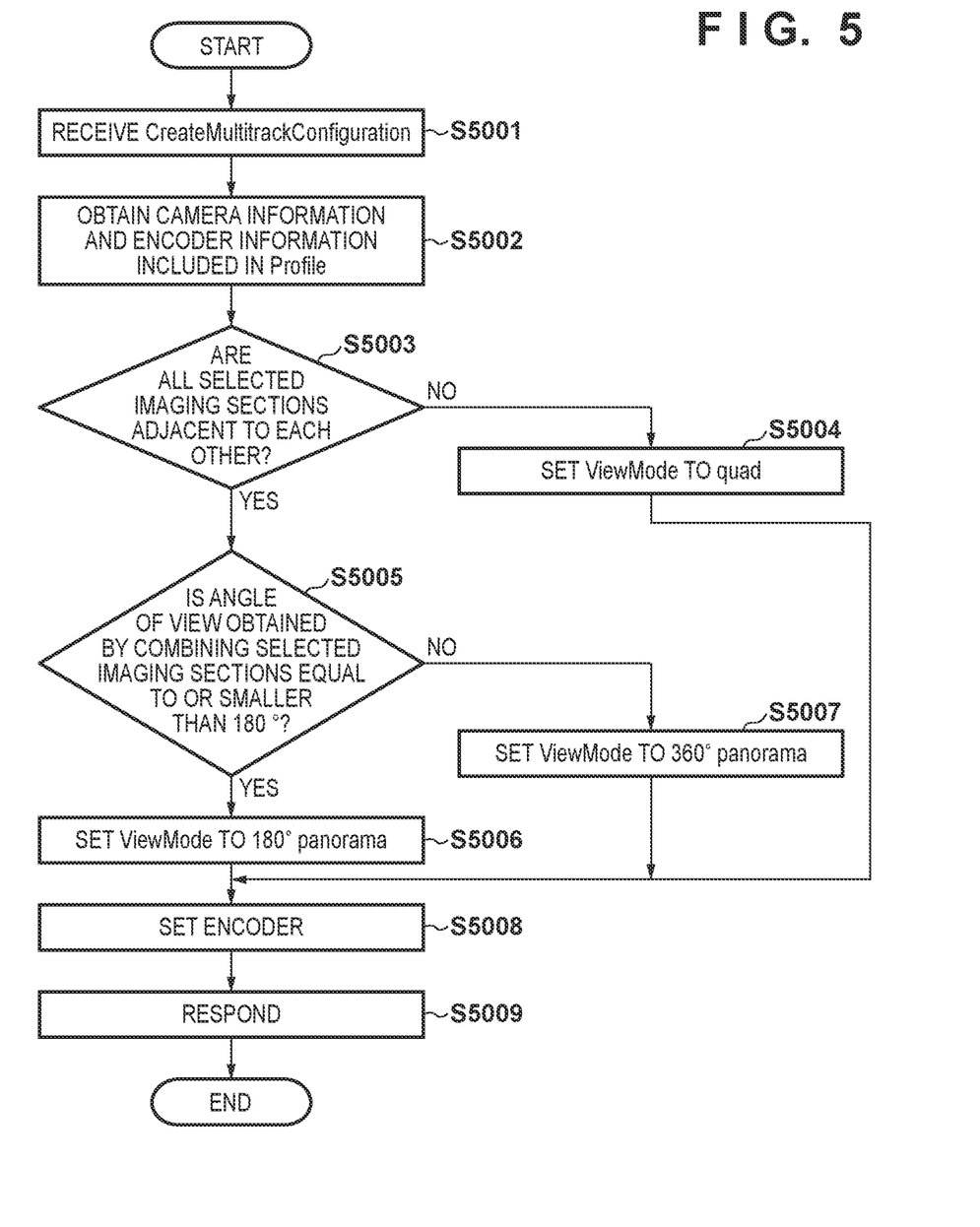
FIG. 5 is a flowchart illustrating a processing example in an operation method according to the first embodiment.
Figure 9A:
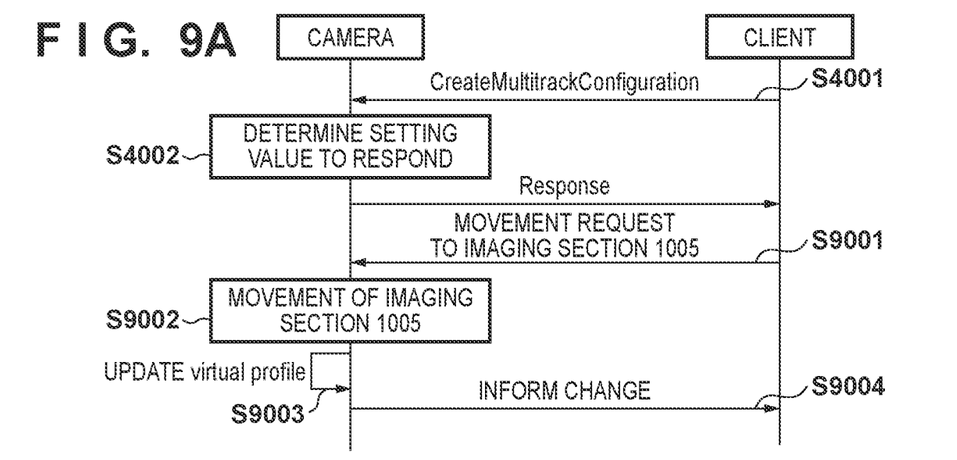
FIGS. 9A to 9C are sequence charts each showing an example of a sequence of a command operation according to the third embodiment.
Figure 9B:
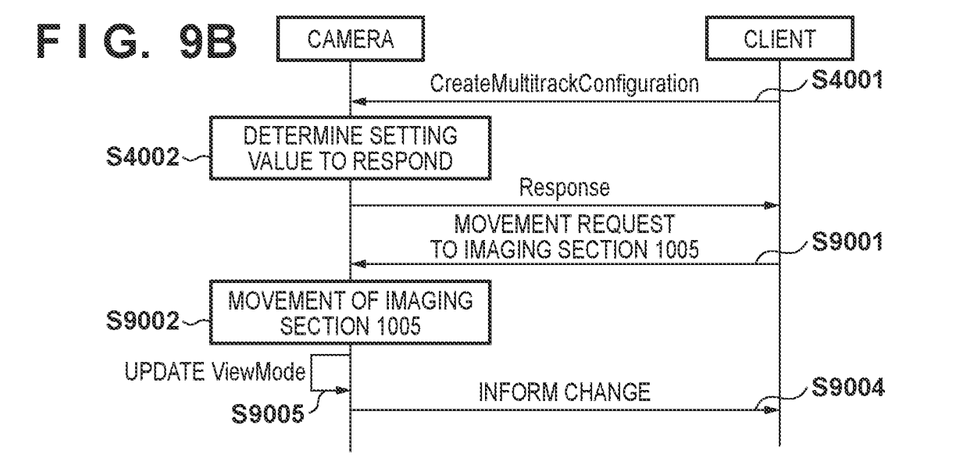
Figure 9C:
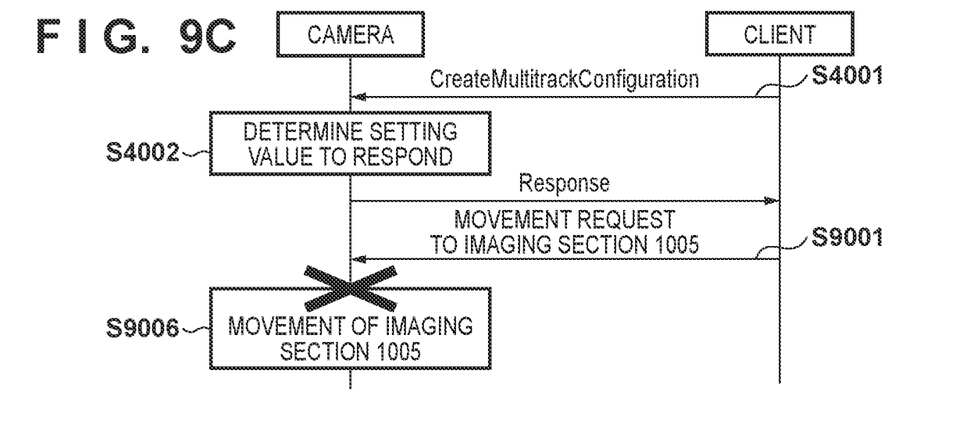

The imaging apparatus according to this embodiment basically performs processing similar to that illustrated in FIG. 5 of the first embodiment. Next, with reference to the sequence charts of FIGS. 9A to 9C, an example of profile synthesis using an ONVIF command (steps S4001 and S4002) and processing related to movement of the imaging section (steps S9001 to S9006) will be described. The processing related to steps S4001 and S4002 is similar to that in the first embodiment, and a repetitive description thereof will be omitted. The processing shown in each of FIGS. 9A to 9C is performed when a movement request command is input to the camera 1000. The movement request command is a command which is input when requesting movement of the imaging section 1005, and in accordance with this command, the camera 1000 can change the position or posture of the designated imaging section 1005.

In this embodiment, a storage unit 1002 stores a table indicating the operation priority at the time of receiving a movement request command by the camera 1000. The camera 1000 refers to the table indicating the operation priority to determine processing for the movement request command, and performs succeeding processing. The camera 1000 according to this embodiment determines, based on the table indicating the operation priority, to perform processing described in any one of FIGS. 9A to 9C to be described later. With reference to each of FIGS. 9A to 9C, processing to be determined in accordance with the table indicating the operation priority will be described below. Note that the same reference numeral denotes processing common in FIGS. 9A to 9C.

In step S9001 after step S4002, an information processing apparatus 2000 sends a movement request command of the imaging section 1005 to the camera 1000. When the movement request command is received, the camera 1000 obtains, from the information processing apparatus 2000, identification information specifying the imaging section 1005 designated by the movement request command among the imaging sections 1005. The processing so far is common in all of FIGS. 9A to 9C.

In the processing shown in FIG. 9A, the camera 1000 moves the imaging section 1005 designated by the movement request command, and then redetermines the setting of the ViewMode including the moved imaging section 1005. In step S9002, the camera 1000 moves the imaging section 1005 designated by the movement request command. In step S9003, the camera 1000 creates a virtual profile including the profiles of all imaging sections specified by the identification information obtained in step S4002, and sets it as a new virtual profile. In step S9004, the camera 1000 informs the information processing apparatus 2000 of the change of virtual profile, and terminates the processing. The virtual profile is created as in steps S5002 to S5008 of FIG. 5 in the first embodiment. According to the processing as shown in FIG. 9A, since the virtual profile according to the profile of the moved imaging section 1005 is newly created, misalignment of the synthesis image caused by the movement of the imaging section can be modified.

In the processing shown in FIG. 9B, the camera 1000 moves the imaging section 1005 designated by the movement request command, and then redetermines the setting of the ViewMode while excluding the moved imaging section 1005. Step S9005 is performed after step S9002. In step S9005, the camera 1000 creates a virtual profile by synthesizing all profiles while excluding the profile of the imaging section designated by the movement request command from the imaging sections corresponding to the identification information obtained in step S4002. The processing in step S9004 is performed after step S9005, and then the processing is terminated. According to the processing as shown in FIG. 9B, even when it is assumed that the captured image becomes unsuitable for synthesis (for example, a wall is displayed therein) due to movement of the imaging section, it is possible to distribute a synthesis image based on the virtual profile recreated while excluding the unsuitable captured image.

In the processing shown in FIG. 9C, if the imaging section designated by the movement request command is any of two or more imaging sections specified by the identification information obtained in step S4002, the movement of the imaging section requested by the command is not performed. That is, in step S9006 after step S9001, the camera 1000 rejects the movement of the imaging section requested by the command, and terminates the processing. According to the processing as shown in FIG. 9C, if a movement request command is issued to the imaging section that captures an image constituting a synthesis image, the command can be rejected to keep the balance of the synthesis image. Note that the processing for the movement request command is not limited to those shown in FIGS. 9A to 9C, and different processing desired by the user may be performed.

According to the processing as described above, if a movement request of the imaging section included in the virtual profile is received, it is possible to determine processing based on the operation priority table, and update the virtual profile or reject the movement request of the imaging section. Therefore, even if a movement request command is sent, it is possible to obtain a synthesis image having desired settings according to a situation assumed by the movement of the imaging section.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-217504, filed Nov. 29, 2019 and Japanese Patent Application No. 2020-130776, filed Jul. 31, 2020, which are hereby incorporated by reference herein in their entirety.

What is claimed is:

1. An imaging apparatus that contains a plurality of imaging sections comprising:
　at least one processor and at least one memory, functioning as:
　　an obtaining unit configured to obtain, from an information processing apparatus, identification information designating two or more imaging sections among the plurality of imaging sections;
　　a determination unit configured to determine, based on pieces of profile information each containing setting information regarding a captured image from each of the imaging sections corresponding to the two or more imaging sections, setting information regarding the captured images upon collectively distributing the captured images from the two or more imaging sections;

a generation unit configured to generate a virtual profile containing the setting information determined by the determination unit; and a sending unit configured to send information regarding the virtual profile to the information processing apparatus.

2. The apparatus according to claim 1, wherein the determined setting information contains quality information of an image distributed upon collectively distributing the captured images from the two or more imaging sections.

3. The apparatus according to claim 2, wherein the quality information contains an encoding method of the image distributed upon collectively distributing the captured images from the two or more imaging sections.

4. The apparatus according to claim 3, wherein the determination unit further determines, based on a combination of the designated two or more imaging sections, the encoding method of the image distributed upon collectively distributing the captured images from the two or more imaging sections.

5. The apparatus according to claim 3, wherein the determination unit further determines the encoding method of the image distributed upon collectively distributing the captured images from the two or more imaging sections in accordance with an encoding method of the captured image from the imaging section contained in setting information regarding the captured image from each of the imaging sections.

6. The apparatus according to claim 3, wherein the determination unit is further for determining the encoding method of the image distributed upon collectively distributing the captured images from the two or more imaging sections in accordance with compression rates of the captured images of the two or more imaging sections.

7. The apparatus according to claim 1, wherein the determined setting information contains a display method of the captured images from the two or more imaging sections upon collectively distributing the captured images from the two or more imaging sections.

8. The apparatus according to claim 7, wherein the determination unit is further for determining the display method based on a combination of the designated two or more imaging sections.

9. The apparatus according to claim 7, wherein the display method includes a method of displaying the captured images from the designated two or more imaging sections in individual frames.

10. The apparatus according to claim 7, wherein the determination unit is further for determining the display method in accordance with an angle of view obtained by combining angles of view of the designated two or more imaging sections.

11. The apparatus according to claim 7, wherein the display method includes a method of displaying a panoramic image obtained by synthesizing the captured images of the two or more imaging sections.

12. The apparatus according to claim 11, wherein the determination unit is further for determining an angle of view of the panoramic image in accordance with the angle of view obtained by combining the angles of view of the designated two or more imaging sections.

13. The apparatus according to claim 7, wherein the determination unit is further for switching, based on a combination of the designated two or more imaging sections, the display method between a method of displaying the captured images from the designated two or more imaging sections in individual frames and a method of displaying a panoramic image obtained by synthesizing the captured images of the designated two or more imaging sections.

14. The apparatus according to claim 7, wherein the display method is determined in accordance with a designation order of the two or more imaging sections designated by the identification information.

15. The apparatus according to claim 7, wherein the determination unit further determines the display method to a predetermined method if no identification information specifying two or more imaging sections among the plurality of imaging sections is obtained.

16. The apparatus according to claim 1, wherein the at least one processor and the at least one memory further function as an output unit configured to output, to the information processing apparatus, setting information regarding the captured image form each of the imaging sections in accordance with identification information designated by the information processing apparatus, and wherein if the information processing apparatus designates identification information specifying information regarding the virtual profile, the output unit outputs the setting information to the information processing apparatus.

17. An information processing apparatus comprising:
at least one processor and at least one memory, functioning as:
a sending unit configured to send identification information designating two or more imaging sections among a plurality of imaging sections contained in an imaging apparatus; and
a receiving unit configured to receive information regarding a virtual profile containing setting information regarding captured images upon collectively distributing the captured images from the two or more imaging sections, the setting information being determined based on pieces of profile information each containing setting information regarding the captured image from each of the imaging sections corresponding to the two or more imaging sections.

18. An operation method of an imaging apparatus that contains a plurality of imaging sections comprising:
obtaining, from an information processing apparatus, identification information designating two or more imaging sections among the plurality of imaging sections;
determining, based on pieces of profile information each containing setting information regarding a captured image from each of the imaging sections corresponding to the two or more imaging sections, setting information regarding the captured images upon collectively distributing the captured images from the two or more imaging sections;
generating a virtual profile containing the setting information determined; and
sending information regarding the virtual profile to the information processing apparatus.

19. An information processing method comprising:
sending identification information designating two or more imaging sections among a plurality of imaging sections contained in an imaging apparatus; and
receiving information regarding a virtual profile containing setting information regarding captured images upon collectively distributing the captured images from the two or more imaging sections, the setting information being determined based on pieces of profile information each containing setting information regarding the captured image from each of the imaging sections corresponding to the two or more imaging sections.

20. An imaging apparatus that contains a plurality of imaging sections comprising:
   at least one processor and at least one memory, functioning as:
     a first determination unit configured to determine, based on a designation of two or more imaging sections among the plurality of imaging sections, a synthesis method of images upon collectively distributing the images from the two or more imaging sections; and
     a second determination unit configured to determine an operation method of the imaging apparatus when a designated imaging section has been moved after the collective distribution of the images from the two or more imaging sections.

21. A non-transitory computer-readable storage medium storing a program that, when executed by a computer, causes the computer to perform a method, the method comprising:
   obtaining, from an information processing apparatus, identification information designating two or more imaging sections among a plurality of imaging sections;
   determining, based on pieces of profile information each containing setting information regarding a captured image from each of the imaging sections corresponding to the two or more imaging sections, setting information regarding the captured images upon collectively distributing the captured images from the two or more imaging sections;
   generating a virtual profile containing the determined setting information; and sending information regarding the virtual profile to the information processing apparatus.

* * * * *